United States Patent
Yilmaz et al.

(10) Patent No.: US 9,354,728 B2
(45) Date of Patent: May 31, 2016

(54) ACTIVE STYLUS WITH CAPACITIVE BUTTONS AND SLIDERS

(75) Inventors: Esat Yilmaz, Santa Cruz, CA (US); Vemund Kval Bakken, Menlo Park, CA (US); Igor Polishchuk, Fremont, CA (US); Kishore Sundara-Rajan, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 372 days.

(21) Appl. No.: 13/335,522

(22) Filed: Dec. 22, 2011

(65) Prior Publication Data

US 2013/0106796 A1     May 2, 2013

Related U.S. Application Data

(60) Provisional application No. 61/553,114, filed on Oct. 28, 2011.

(51) Int. Cl.
*G06F 3/038*     (2013.01)
*G06F 3/0354*     (2013.01)

(52) U.S. Cl.
CPC .......... *G06F 3/0383* (2013.01); *G06F 3/03545* (2013.01)

(58) Field of Classification Search
CPC ....... G06F 3/044; G06F 3/041; G06F 3/0412; G06F 3/0416; G06F 2203/041; G06F 2203/04101; G06F 2203/04106; G06F 2203/04108; G06F 3/03545; G06F 3/0383
USPC ..................... 345/173–183; 178/18.01–20.04
See application file for complete search history.

(56) References Cited

U.S. PATENT DOCUMENTS

| | | |
|---|---|---|
| 4,695,680 A | 9/1987 | Kable |
| 5,973,677 A | 10/1999 | Gibbons |
| 7,612,767 B1 | 11/2009 | Griffin |
| 7,663,509 B2 | 2/2010 | Shen |
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |

(Continued)

FOREIGN PATENT DOCUMENTS

WO     WO 2012/129247     9/2012

OTHER PUBLICATIONS

Kyung, Ki-Uk et al., "wUbi-Pen : Windows Graphical User Interface Interacting with Haptic Feedback Stylus," *SIGGRAPH,*, Los Angeles, California, Aug. 2008.

(Continued)

*Primary Examiner* — Liliana Cerullo
(74) *Attorney, Agent, or Firm* — Baker Botts L.L.P.

(57) ABSTRACT

In one embodiment, a device includes a form factor of a stylus. The form factor includes a surface area. The device also includes one or more substrates disposed along one or more portions of the surface area; and one or more touch sensors disposed on one or more of the substrates. At least one of the touch sensors includes a distinct touch-sensitive area that includes a touch-sensitive button, a touch-sensitive wheel, or a touch-sensitive slider. The device also includes a computer-readable non-transitory storage medium coupled to one or more of the touch sensors and embodying logic configured to associate the distinct touch-sensitive area with a pre-determined function of the device.

20 Claims, 7 Drawing Sheets

(56) References Cited

U.S. PATENT DOCUMENTS

| | | | |
|---|---|---|---|
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,723,824 | B2 | 5/2014 | Myers |
| 2002/0149572 | A1* | 10/2002 | Schulz et al. .............. 345/174 |
| 2006/0197750 | A1 | 9/2006 | Kerr et al. |
| 2006/0250380 | A1 | 11/2006 | Oliver |
| 2008/0238885 | A1 | 10/2008 | Zachut |
| 2008/0297477 | A1 | 12/2008 | Hotelling et al. |
| 2008/0309635 | A1 | 12/2008 | Matsuo |
| 2009/0073144 | A1* | 3/2009 | Chen et al. .............. 345/179 |
| 2009/0095540 | A1 | 4/2009 | Zachut |
| 2009/0115725 | A1 | 5/2009 | Shemesh |
| 2009/0127005 | A1 | 5/2009 | Zachut |
| 2009/0153152 | A1 | 6/2009 | Maharyta |
| 2009/0184939 | A1 | 7/2009 | Wohlstadter |
| 2009/0251434 | A1 | 10/2009 | Rimon |
| 2009/0315854 | A1 | 12/2009 | Matsuo |
| 2010/0006350 | A1 | 1/2010 | Elias |
| 2010/0155153 | A1 | 6/2010 | Zachut |
| 2010/0292945 | A1 | 11/2010 | Reynolds |
| 2010/0315384 | A1 | 12/2010 | Hargreaves |
| 2011/0007029 | A1 | 1/2011 | Ben-David |
| 2011/0267316 | A1* | 11/2011 | Kim et al. .............. 345/175 |
| 2012/0068964 | A1* | 3/2012 | Wright et al. .............. 345/174 |
| 2012/0200503 | A1 | 8/2012 | Berenger |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2012/0327041 | A1 | 12/2012 | Harley |
| 2013/0076612 | A1 | 3/2013 | Myers |
| 2013/0106766 | A1 | 5/2013 | Yilmaz et al. |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

Non-Final Office Action in U.S. Appl. No. 13/333,791, May 23, 2013.

Response to Non-Final Office in Application No. 13/333,791, filed Nov. 21, 2013.

E. Yilmaz, U.S. Appl. No. 13/333,791 Final Office Action, Feb. 11, 2014.

E. Yilmaz, U.S. Appl. No. 13/333,791 RCE and Response, Jul. 11, 2014.

Yilmaz et al., U.S. Appl. No. 13/333,791, Notice of Non-Compliant Amendment Jul. 17, 2014.

Yilmaz et al., U.S. Appl. No. 13/333,791, RCE and Amendment resubmitted Sep. 12, 2014.

Yilmaz et al., U.S. Appl. No. 13/333,791, Non-final Rejection dated Nov. 20, 2014.

Yilmaz et al., U.S. Appl. No. 13/333,791, Response to Non-Final dated Feb. 20, 2015.

Yilmaz et al., U.S. Appl. No. 13/333,791, Final Rejection dated Jul. 2, 2015.

* cited by examiner

ACTIVE STYLUS WITH CAPACITIVE BUTTONS AND SLIDERS

RELATED APPLICATION

This application claims the benefit, under 35 U.S.C. §119 (e), of U.S. Provisional Patent Application No. 61/553,114, filed Oct. 28, 2011, which is incorporated herein by reference.

TECHNICAL FIELD

This disclosure generally relates to touch sensors.

BACKGROUND

A touch-position sensor, or a touch sensor, may detect the presence and location of an object or the proximity of an object (such as a user's finger or a stylus) within a touch-sensitive area of the touch sensor overlaid, for example, on a display screen. In a touch sensitive display application, the touch position sensor may enable a user to interact directly with what is displayed on the screen, rather than indirectly with a mouse or touch pad. A touch sensor may be attached to or provided as a part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch position sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
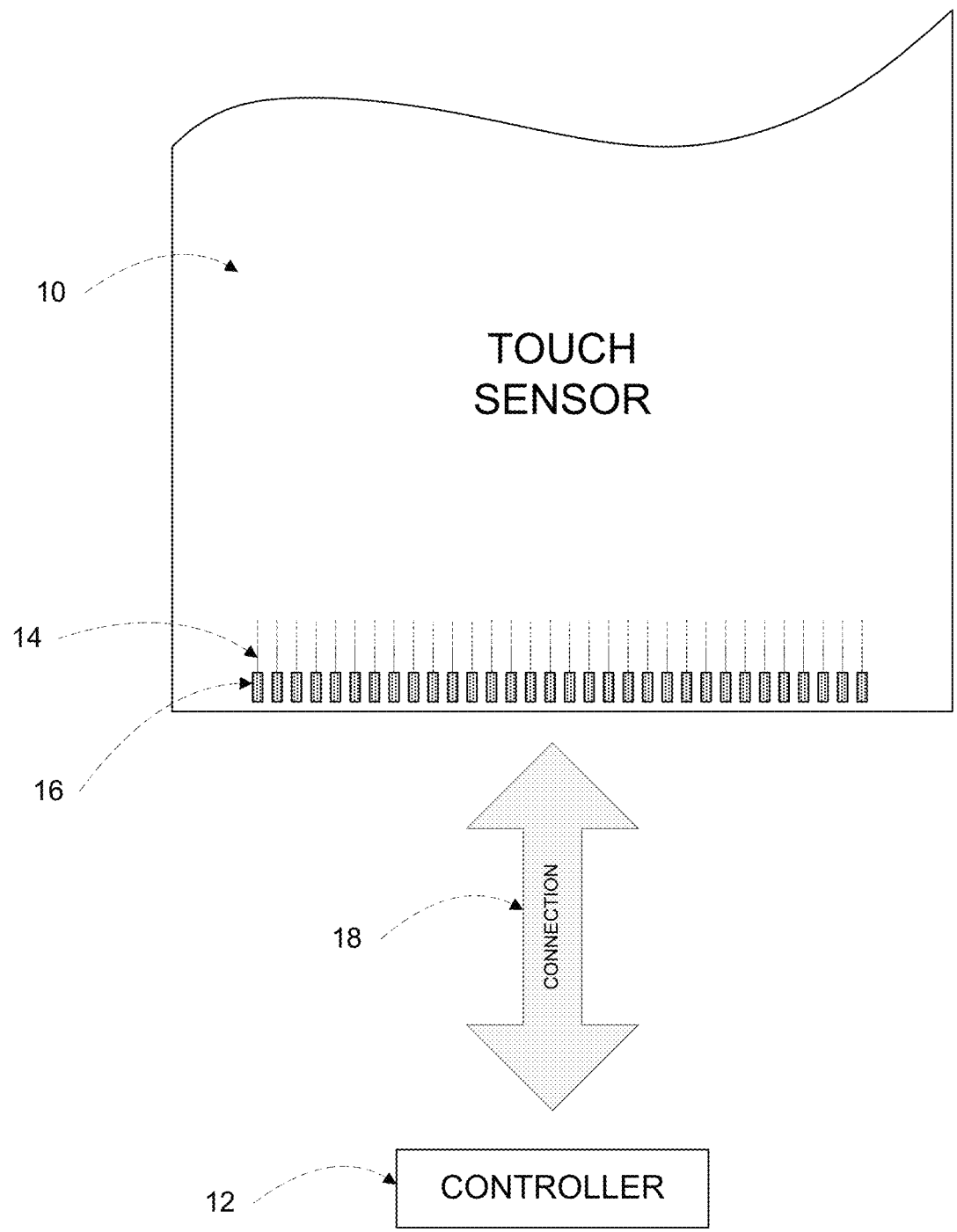
FIG. 1 illustrates an example touch sensor with an example controller.

FIG. 1 illustrates an example touch sensor 10 with an example controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on a FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
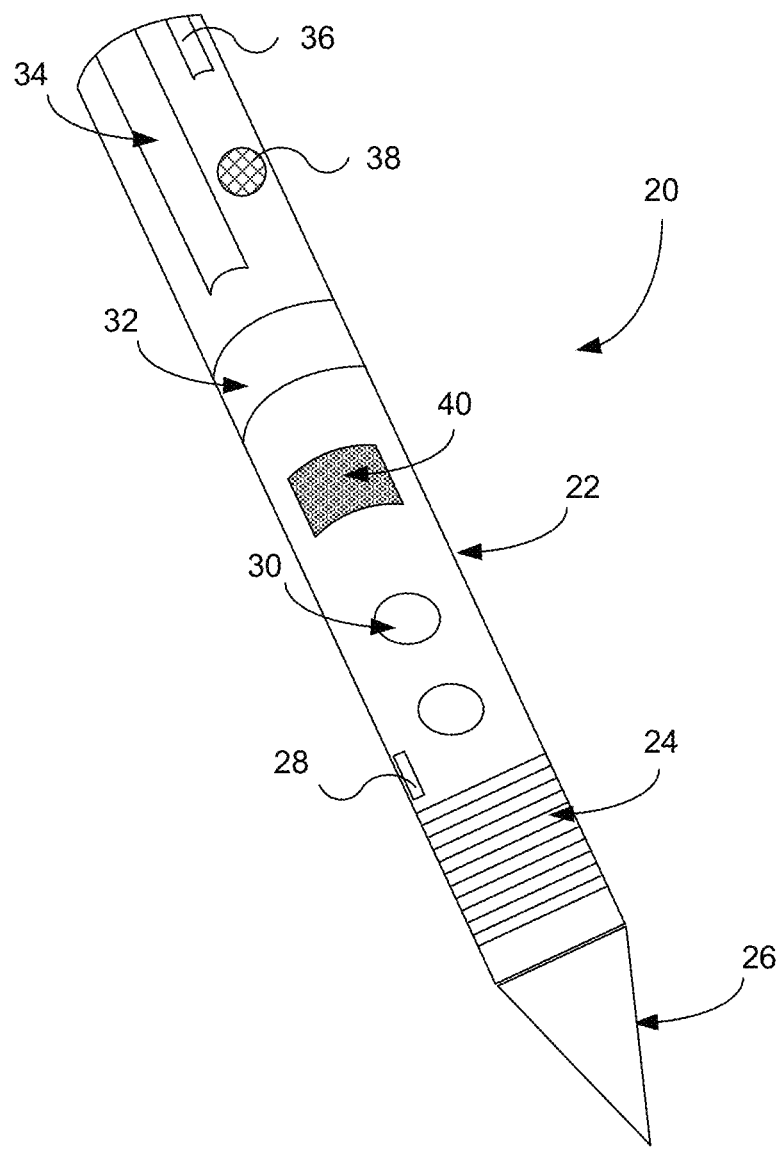
FIG. 2 illustrates an example exterior of an example active stylus.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), Smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
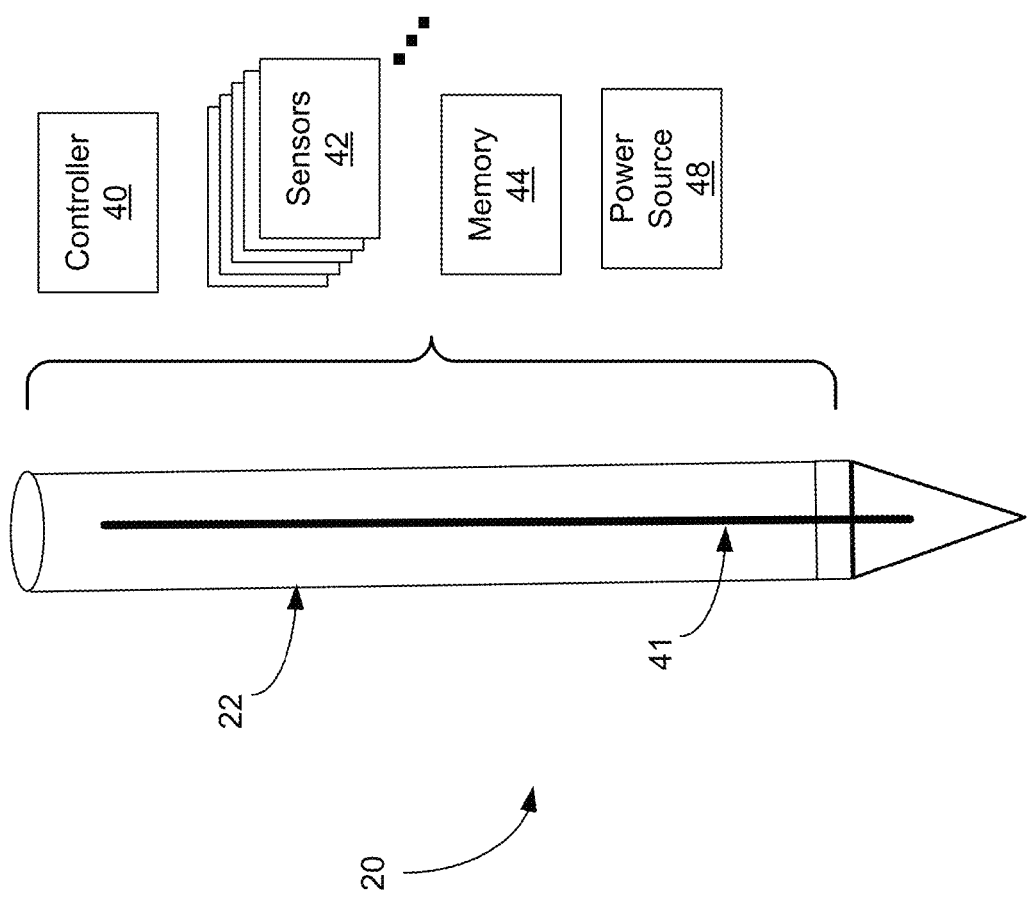
FIG. 3 illustrates an example internal components of example active stylus.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
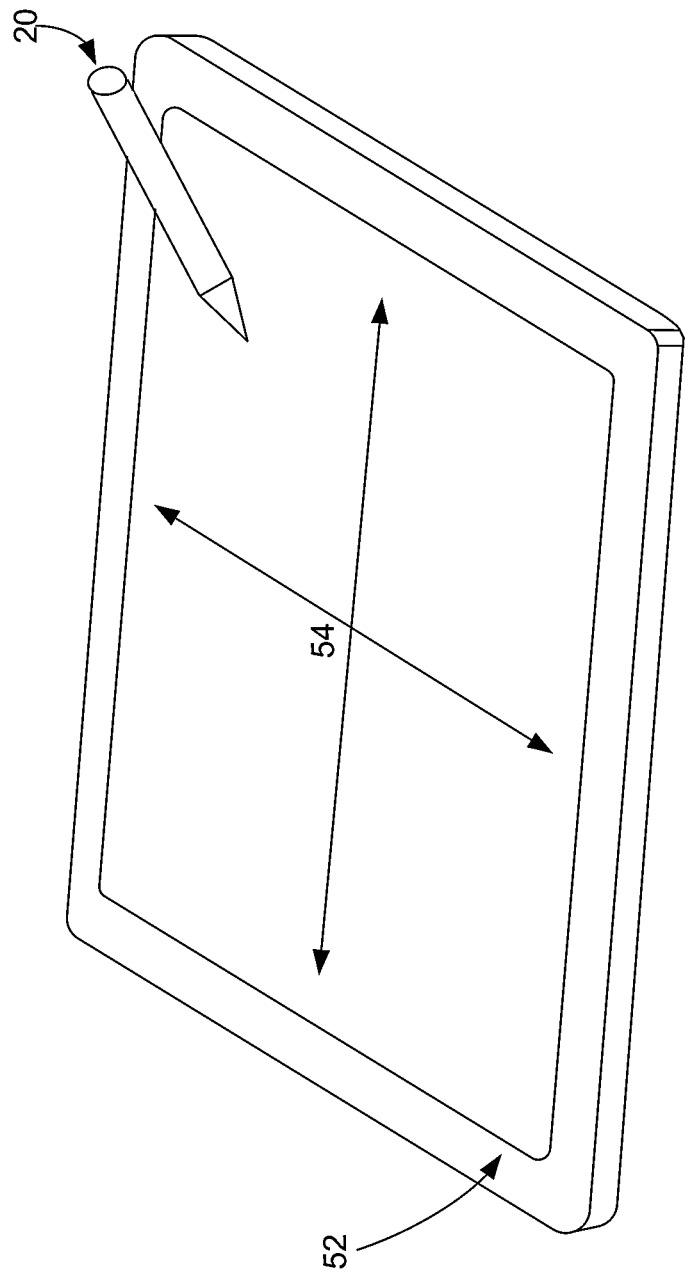
FIG. 4 illustrates an example active stylus with an example device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5A:
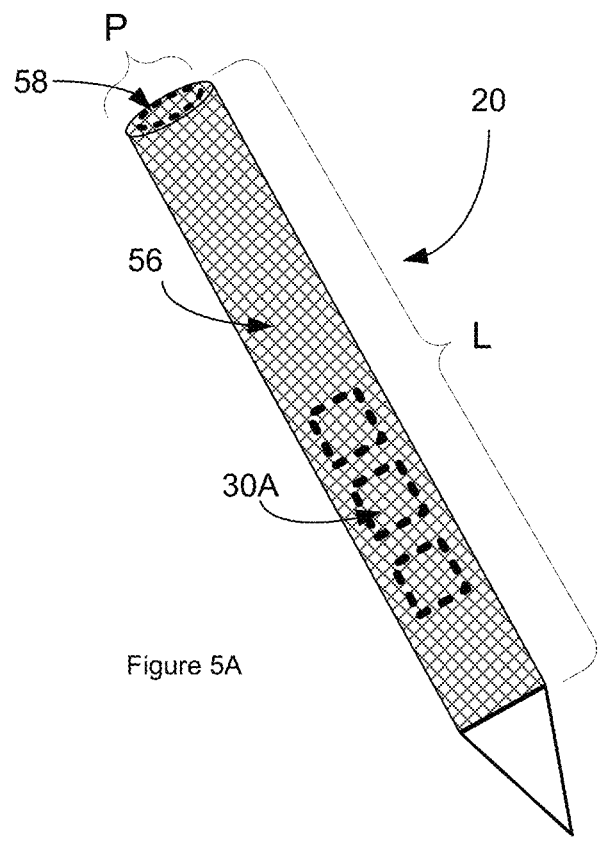
FIGS. 5A-B illustrate an example active stylus of FIG. 2 with touch-sensitive area buttons.
Figure 5B:
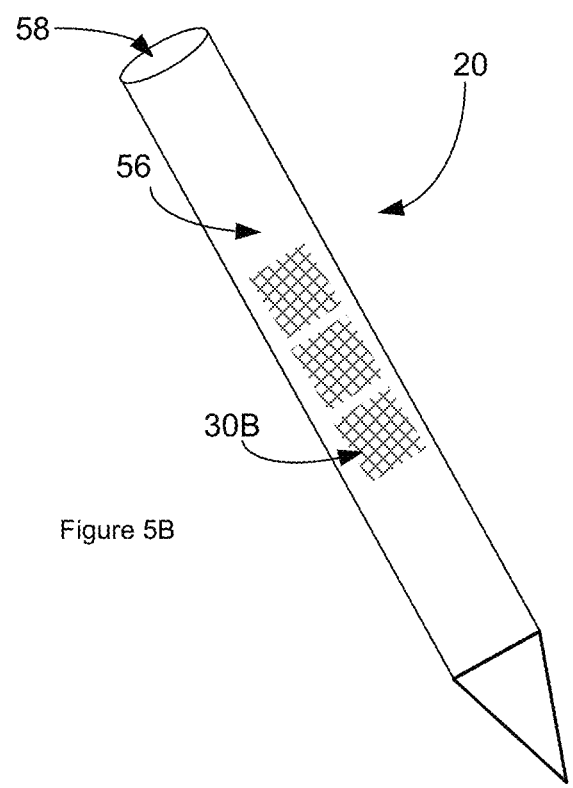

The controller of active stylus 20 may use particularly shaped touch-sensitive areas to function as external components of active stylus 20 such as for example a button, slider, wheel slider, or combination thereof FIGS. 5A-B illustrate an example active stylus of FIG. 2 with touch-sensitive area buttons. In particular embodiments, flexible substrate 56 may be made of substantially transparent material. In particular embodiments, flexible substrate 56 may be made of substantially opaque material. This disclosure contemplates any suitable substrate with any suitable portions made of any suitable material. In particular embodiments, the substrate 56 may be made using substantially flexible material, such that structural integrity of the substrate is substantially maintained after significant deformation. As an example and not by way of limitation, a substrate made of substantially flexible material may enable one or more portions of the flexible substrate 56 to be applied to a curved surface, or to wrap over an edge of a surface. Flexible substrate 56 is wrapped along a perimeter P and through length L of the entire form factor of active stylus 20 up to tip 26. As an example and not by way of limitation, flexible substrate 56 may be disposed along perimeter P that includes an inner surface and/or outer surface of outer body 22 of active stylus 20. As another example, a portion of flexible substrate 56 may cover the inner and/or outer surface of a top end 58 of the form factor of active stylus 20 situated opposite the tip 26 of the form factor.

In particular embodiments, the drive and sense electrodes of the touch sensor composed of conductive material are disposed and substantially cover a surface of flexible substrate 56, where flexible substrate 56 is disposed over substantially the entire surface of active stylus 20, excluding tip 26. The surface of active stylus 20 on which flexible substrate 56 is disposed includes the substantially cylindrical form factor illustrated in FIG. 5A, and includes top end 58 of the form factor of active stylus 20 situated opposite the tip 26 of the form factor. The drive and sense electrodes define a touch-sensitive area of the touch sensor. As an example and not by way of limitation, the conductive material may form a conductive mesh that is used to form the drive and sense electrodes of the touch sensor. In particular embodiments, the drive or sense electrodes in touch sensor may be made of ITO in whole or in part. In particular embodiments, the drive or sense electrodes in touch sensor may be made of fine lines of metal or other conductive material. As an example and not by way of limitation, one or more portions of the conductive material may be copper or copper-based and have a thickness of approximately 5 μm or less and a width of approximately 10 μm or less. In example of FIG. 5A, the touch sensor disposed on flexible substrate 56 is logically partitioned into a plurality of distinct touch-sensitive areas 30A by the controller of active stylus 20. It should be noted the lines illustrating the logically partitioned distinct touch-sensitive areas 30A in FIG. 5A are notional and do not represent physical cuts of conductive material. In contrast, in the example of FIG. 5B, the drive and sense electrodes of the touch sensor composed of conductive material are disposed on the surface of flexible substrate 56 and are physically partitioned into distinct touch-sensitive areas 30B. In particular embodiments, flexible substrate 56 may substantially cover the entire inner and/or outer surface of the form factor of active stylus 20. In other particular embodiments, flexible substrate 56 may cover a portion of the inner and/or outer surface of the form factor of active stylus 20. As another example, the flexible conductive material of the touch sensor may be part of a FPC. Alternatively, in particular embodiments, the drive and sense electrodes of the touch sensor may be molded into the inner surface or outer surface of outer body 22 of active stylus 20.

Distinct touch-sensitive areas 30A-B are configured as buttons of active stylus 20 to detect a touch or proximity input within distinct touch-sensitive areas 30A-B. In particular embodiments, touch-sensitive areas of the touch sensor not allocated to function as external components may be used for other touch-sensitive applications, such as for example, detecting whether active stylus 20 is being held by a user for power management. In particular embodiments, distinct touch-sensitive areas 30A-B have particular dimensions and positions within the form factor of active stylus 20. As an example and not by way of limitation, touch-sensitive areas 30A-B may be substantially square and function as buttons. As another example, a touch-sensitive area situated at an end of the form factor opposite a tip of the form factor may function as a button. Although this disclosure describes and illustrates particularly sized and positioned touch-sensitive areas corresponding to particular pre-determined functions, this disclosure contemplates a touch sensor with any suitable number of distinct touch-sensitive areas each having any suitable shape and position within the form factor to detect a touch or proximity input within the distinct touch-sensitive areas.

In particular embodiments, the controller of active stylus 20 may be associate each distinct touch-sensitive area 30A-B with a pre-determined function of active stylus 30 or device 52 based on the mode of operation of active stylus 20. Moreover, the pre-determined function associated with each distinct touch-sensitive area 30A-B may change when the mode of operation changes or based on input from the user. As an example and not by way of limitation, a distinct touch-sensitive area (e.g. 30A) may be associated with toggling power to active stylus 20 when active stylus 20 is in a stylus mode of operation. When in a mouse mode of operation, the same distinct touch-sensitive area 30A may be associated with a mouse click of an object displayed on the display of device 52. Alternately, the associating of the distinct touch-sensitive areas 30A-B with particular pre-determined functions may be determined by input of the user. Although this disclosure describes associating particular pre-determined functions with distinct touch-sensitive areas for particular operating modes of the active stylus, this disclosure contemplates associating any suitable pre-determined function with distinct touch-sensitive areas for any suitable operating mode of the active stylus.

In particular embodiments, the controller of active stylus 20 detects and processes a touch or proximity input substantially within distinct touch-sensitive areas 30A-B to initiate the particular pre-determined function of active stylus 20 associated with a particular touch-sensitive area 30A-B. As an example and not by way of limitation, touch-sensitive area 30A may be associated with a power function of active stylus 20. A touch or proximity input substantially within substantially square touch-sensitive area 30A may toggle power to active stylus 20, thereby turning active stylus 20 on or off. In other particular embodiments, the controller of active stylus 20 may detect and processes a touch or proximity input substantially within distinct touch-sensitive area (e.g. 30B) to initiate communication between active stylus 20 and device 52, where the communication corresponds to the pre-determined function associated with the particular touch-sensitive area (e.g. 30B). As an example and not by way of limitation, a touch or proximity input substantially within substantially square touch-sensitive area 30B may initiate a mouse click on an object displayed on the display of device 52.

Figure 6A:
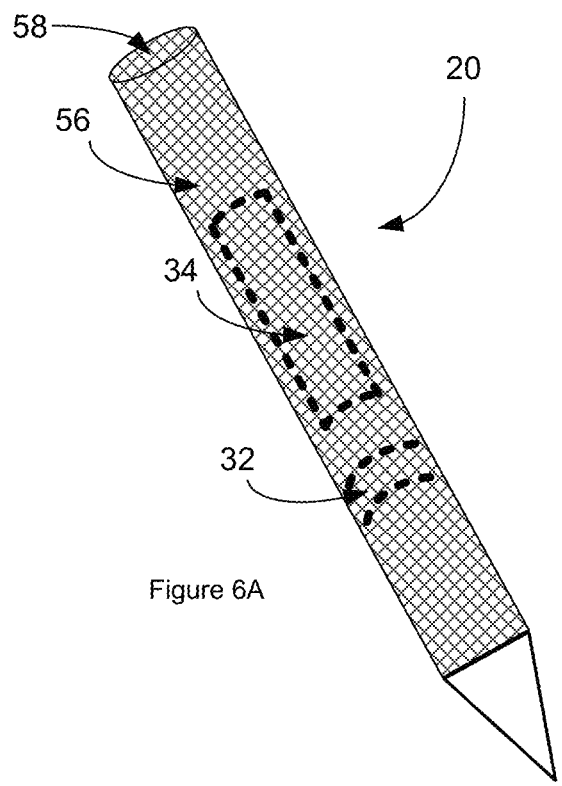
FIGS. 6A-B illustrate an example active stylus of FIG. 2 with touch-sensitive area sliders.
Figure 6B:
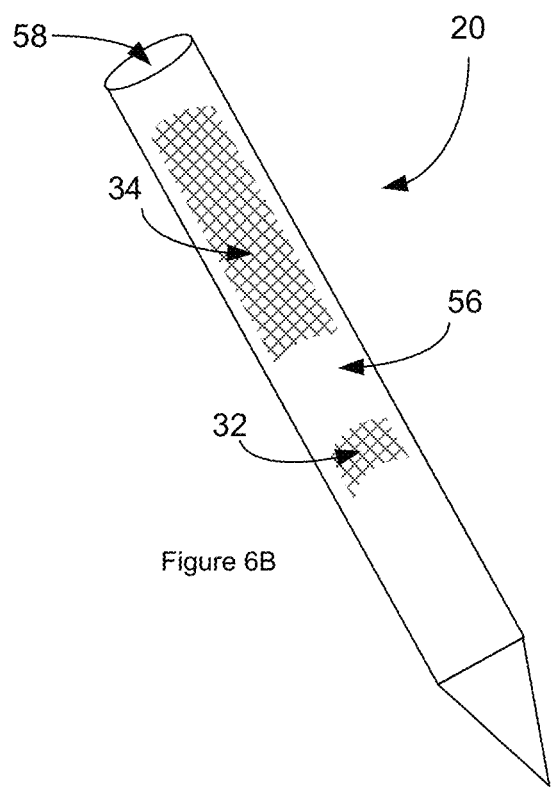

FIGS. 6A-B illustrate an example active stylus of FIG. 2 with touch-sensitive area sliders. As described above, flexible substrate 56 is wrapped along a perimeter P and through length L of the entire form factor of active stylus 20 up to tip 26. As an example and not by way of limitation, flexible substrate 56 may be disposed along perimeter P that includes an inner surface and/or outer surface of outer body 22 of active stylus 20. As another example, a portion of flexible substrate 56 may cover the inner and/or outer surface of a top end 58 of the form factor of active stylus 20 situated opposite the tip 26 of the form factor. In particular embodiments, flexible substrate 56 may be made of substantially transparent material. In particular embodiments, flexible substrate 56 may be made of substantially opaque material.

In example of FIG. 6A, the drive and sense electrodes of the touch sensor composed of conductive material are disposed and substantially cover a surface of flexible substrate 56, where flexible substrate 56 is disposed over substantially the entire surface of active stylus 20, excluding tip 26. The surface of active stylus 20 on which flexible substrate 56 is disposed includes the substantially cylindrical form factor illustrated in FIG. 6A, and includes top end 58 of the form factor of active stylus 20 situated opposite the tip 26 of the form factor. As an example and not by way of limitation, the conductive material may form a conductive mesh that is used to form the drive and sense electrodes of the touch sensor. In particular embodiments, the drive or sense electrodes in touch sensor may be made of ITO in whole or in part. In particular embodiments, the drive or sense electrodes in touch sensor may be made of fine lines of metal or other conductive material. As described above, the touch sensor may be logically partitioned into a plurality of distinct touch-sensitive areas 32A and 34A by the controller of active stylus 20. It should be noted the lines illustrating the logically partitioned distinct touch-sensitive areas 32A and 34A in FIG. 6A are notional and do not represent physical cuts of conductive material.

In contrast, in the example of FIG. 6B, the drive and sense electrodes of the touch sensor composed of conductive material are disposed on the surface of flexible substrate 56 and are physically partitioned into distinct touch-sensitive areas 32B and 34B. In particular embodiments, flexible substrate 56 may substantially cover the entire inner and/or outer surface of the form factor of active stylus 20. In other particular embodiments, flexible substrate 56 may cover a portion of the inner and/or outer surface of the form factor of active stylus 20.

Distinct touch-sensitive areas 32A-B and 34A-B are configured as sliders or wheel sliders to detect a touch or proximity input that is a movement substantially within distinct touch-sensitive areas 32A-B and 34A-B. In particular embodiments, distinct touch-sensitive areas 32A-B and 34A-B have particular dimensions and positions within the form factor of active stylus 20. As an example and not by way of limitation, touch-sensitive areas 32A-B and 34A-B may be substantially rectangular and function as sliders or wheel sliders. Although this disclosure describes and illustrates particularly sized and positioned touch-sensitive areas corresponding to particular pre-determined functions, this disclosure contemplates a touch sensor with any suitable number of distinct touch-sensitive areas each having any suitable shape and position within the form factor to detect a touch or proximity input that is a movement substantially within distinct touch-sensitive areas.

In particular embodiments, the controller of active stylus 20 may be associate each distinct touch-sensitive area 32A-B and 34A-B with a pre-determined function of active stylus 30 or device 52 based on the mode of operation of active stylus 20. Moreover, the pre-determined function associated with each distinct touch-sensitive area 32A-B and 34A-B may change when the mode of operation changes or based on input from the user. As an example and not by way of limitation, a distinct touch-sensitive area (e.g. 34A) may be associated with toggling power to active stylus 20 when active stylus 20 is in a stylus mode of operation. When in a mouse mode of operation, the same distinct touch-sensitive area 34A may be associated with moving a webpage displayed on a display of device 52. Alternately, the associating of the distinct touch-sensitive areas 32A-B and 34A-B with particular pre-determined functions may be determined by input of the user. Although this disclosure describes associating particular pre-determined functions with distinct touch-sensitive areas for particular operating modes of the active stylus, this disclosure contemplates associating any suitable pre-determined function with distinct touch-sensitive areas for any suitable operating mode of the active stylus.

In particular embodiments, the controller of active stylus 20 detects and processes a touch or proximity input that is a movement substantially within distinct touch-sensitive areas 32A-B and 34A-B to initiate the particular pre-determined function of active stylus 20 associated with the particular touch-sensitive area 32A-B and 34A-B. As an example and not by way of limitation, in the mouse mode a substantially rectangular touch-sensitive area 32A-B of the touch sensor located around the circumference of the form factor of active stylus 20 may function as a wheel slider. As another example, a touch or proximity input that is a movement substantially within substantially rectangular touch-sensitive area 34A-B may toggle power to active stylus 20, thereby turning active stylus 20 on or off. In other particular embodiments, the controller of active stylus 20 may detect and processes a touch or proximity input that is a movement substantially within distinct touch-sensitive area (e.g. 34B) to initiate communication between active stylus 20 and device 52, where the communication corresponds to the pre-determined function associated with the particular touch-sensitive area (e.g. 34A). As an example and not by way of limitation, a touch or proximity input that is a movement within substantially rectangular touch-sensitive area 34A may initiate movement of a cursor displayed on the display of device 52.

Figure 7:
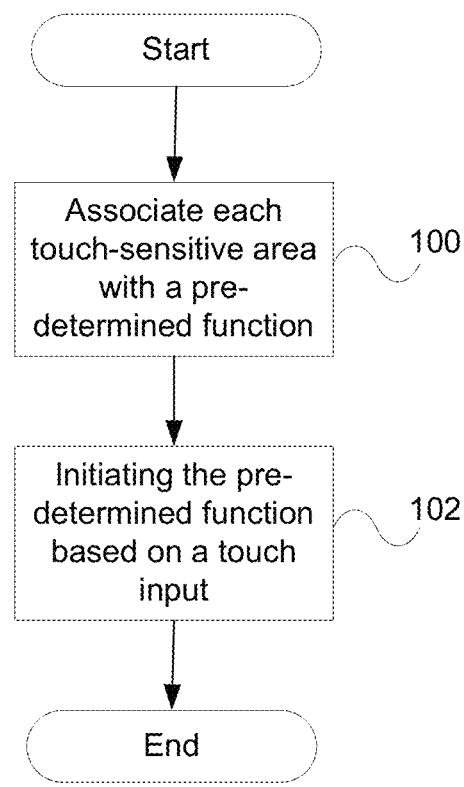
FIG. 7 illustrates an example method for using a touch sensor for external components of an active stylus.

FIG. 7 illustrates an example method for using a touch sensor for external components of an active stylus. The method starts at step 100, where each distinct touch-sensitive area of a touch sensor is associated with a pre-determined function of a device. In particular embodiments, the touch sensor is disposed on substrate that is disposed along a perimeter and through a portion of the length of a stylus form factor. At step 102, the pre-determined function is initiated based on a touch or proximity input being detected within the touch-sensitive area, at which point the method may end. In particular embodiments, the initiated pre-determined function changes the font size of text displayed on the display of a device in communication with the active stylus. In other particular embodiments, a touch or proximity input that is a movement detected within the touch-sensitive area initiates powering off the active stylus. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components carrying out particular steps of the method of FIG. 7, this disclosure contemplates any suitable combination of any suitable components carrying out any suitable steps of the method of FIG. 7.

Herein, reference to a computer-readable storage medium may include a semiconductor-based or other integrated circuit (IC) (such, as for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable storage medium, or a suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
   one or more substrates disposed along one or more portions of a surface area of the device, the device having a form factor of a stylus, wherein the device comprises a tip, an end opposite the tip, and a shaft;

one or more touch sensors disposed on one or more of the substrates, at least one of the touch sensors comprising a distinct touch-sensitive area configured as a wheel slider aligned around a circumference of the device, wherein the distinct touch-sensitive area comprises a flexible mesh formed using lines of conductive material; and a computer-readable non-transitory storage medium coupled to one or more of the touch sensors and embodying logic configured when executed to:
associate the distinct touch-sensitive area with a pre-determined function of the device;
transmit signals wirelessly to another device through a touch sensor of the other device; and
initiate the pre-determined function based on a change in position of a touch or proximity input substantially within the distinct touch-sensitive area of the device having the form factor of a stylus, wherein the pre-determined function initiates a movement of an object displayed on the other device.

2. The device of claim 1, wherein one of the portions of the surface area comprises the end and the tip of the device.

3. The device of claim 1, wherein the substrate is a flexible substrate.

4. The device of claim 1, wherein one or more of the touch sensors comprise a plurality of physically distinct touch-sensitive areas, each of the physically distinct touch-sensitive areas comprises drive or sense electrodes made of flexible conductive material.

5. The device of claim 1, wherein the logic is configured to logically partition one or more of the touch sensors into a plurality of logically distinct touch-sensitive areas.

6. The device of claim 1, wherein the logic is further configured to
associate the distinct touch-sensitive area with another pre-determined function based on a mode of operation of the device.

7. The device of claim 1, wherein:
the shaft is positioned within an outer body of the device having the form factor of a stylus and extends along an axis running from the end to the tip; and
the logic is further configured when executed to supply signals to electrodes of the tip through the shaft.

8. A method comprising:
associating a distinct touch-sensitive area of at least one touch sensor with a pre-determined function of a device, the distinct touch-sensitive area configured as a wheel slider aligned around a circumference of the device and comprising a flexible mesh formed using lines of conductive material, one or more of the touch sensors being disposed on one or more substrates, one or more of the substrates being disposed along one or more portions of a surface area of a stylus, the device embodying logic configured when executed to transmit signals wirelessly to another device through a touch sensor of the other device, wherein the device comprises a tip, an end opposite the tip, and a shaft; and
initiating the pre-determined function based on a change in position of a touch or proximity input within the distinct touch-sensitive area of the device having the form factor of a stylus, wherein the pre-determined function initiates a movement of an object displayed on the other device.

9. The method of claim 8, wherein one or more of the portions of the surface area comprises a length and a cross-section with a perimeter, one or more of the substrates being disposed along a portion of the perimeter through at least a portion of the length.

10. The method of claim 8, wherein one of the portions of the surface area comprises the end and the tip of the device.

11. The method of claim 8, wherein the substrate is a flexible substrate.

12. The method of claim 8, wherein one or more of the touch sensors comprise a plurality of physically distinct touch-sensitive areas, each of the physically distinct touch-sensitive areas comprises drive or sense electrodes made of flexible conductive material.

13. The method of claim 8, further comprising associating the distinct touch-sensitive area with another pre-determined function based on a mode of operation of the device.

14. The method of claim 8, further comprising logically partitioning one or more of the touch sensors into a plurality of logically distinct touch-sensitive areas.

15. A computer-readable non-transitory storage medium embodying logic configured when executed to:
associate a distinct touch-sensitive area of at least one touch sensor with a pre-determined function of a device, the distinct touch-sensitive area configured as a wheel slider aligned around a circumference of the device and comprising a flexible mesh formed using lines of conductive material, one or more of the touch sensors being disposed on one or more substrates, one or more of the substrates being disposed along one or more portions of a surface area of a stylus, the device embodying logic configured when executed to transmit signals wirelessly to another device through a touch sensor of the other device, wherein the device comprises a tip, an end opposite the tip, and a shaft; and
initiate the pre-determined function based on a change in position of a touch or proximity input substantially within the distinct touch-sensitive area of the device having the form factor of a stylus, wherein the pre-determined function initiates a movement of an object displayed on the other device.

16. The medium of claim 15, wherein one or more of the portions of the surface area comprises a length and a cross-section with a perimeter, one or more of the substrates being disposed along a portion of the perimeter through at least a portion of the length.

17. The medium of claim 15, wherein one of the portions of the surface area comprises the end and the tip of the device.

18. The medium of claim 15, wherein the logic is further configured to associate the distinct touch-sensitive area with another pre-determined function based on a mode of operation of the device.

19. The medium of claim 15, wherein the touch sensor comprises a plurality of physically distinct touch-sensitive areas, each of the physically distinct touch-sensitive areas comprises drive or sense electrodes made of flexible conductive material.

20. The medium of claim 15, wherein the logic is further configured to logically partition one or more of the touch sensors into a plurality of logically distinct touch-sensitive areas.

* * * * *